United States Patent [19]

Dawson et al.

[11] Patent Number: 5,465,792
[45] Date of Patent: Nov. 14, 1995

[54] METHOD OF CONTROLLING PRODUCTION OF EXCESS WATER IN OIL AND GAS WELLS

[75] Inventors: Jeffrey C. Dawson, Spring; Hoang Van Le, Houston, both of Tex.

[73] Assignee: BJ Services Company, Houston, Tex.

[21] Appl. No.: 277,955

[22] Filed: Jul. 20, 1994

[51] Int. Cl.⁶ .................................................. E21B 33/138
[52] U.S. Cl. .................................. 166/295; 166/294
[58] Field of Search ............................ 166/294, 295; 405/264; 523/130

[56] References Cited

U.S. PATENT DOCUMENTS

| | | | |
|---|---|---|---|
| 3,302,717 | 2/1967 | West et al. | 166/295 X |
| 3,810,468 | 5/1974 | Harper et al. | |
| 4,282,928 | 8/1981 | McDonald et al. | 166/295 X |
| 4,328,864 | 5/1982 | Friedman | 166/295 X |
| 4,572,295 | 2/1986 | Walley | 166/295 |
| 4,635,726 | 1/1987 | Walker | 166/294 |
| 4,828,911 | 5/1989 | Morman | 428/288 |
| 4,952,550 | 8/1990 | Wallach et al. | 502/404 |
| 5,073,202 | 12/1991 | Wallach | 134/6 |
| 5,278,206 | 1/1994 | Göbel et al. | 524/13 |

*Primary Examiner*—George A. Suchfield
*Attorney, Agent, or Firm*—Charles D. Gunter, Jr.; Grady K. Bergen

[57] ABSTRACT

The production of excessive water in oil and gas wells and other subterranean formations is reduced by introducing a hydrocarbon fluid containing dispersed superabsorbing particles formed using invert emulsion polymerization techniques wherein the superabsorbing particles are formed from hydratable polymers which are cross-linked so that they are insoluble in water. By introducing these superabsorbing particles into fluid passages of the formation, the water producing zones can be selectively blocked off by allowing the superabsorbing particles to swell with the absorption of water within the aqueous fluid containing fluid passages, while the superabsorbing particles remain small and unswollen in the hydrocarbon conducting fluid passages. Thus, the ability of fluids to flow through the aqueous fluid containing fluid passages is selectively reduced resulting in the reduced production of aqueous fluids while maintaining production of hydrocarbons.

36 Claims, No Drawings

METHOD OF CONTROLLING PRODUCTION OF EXCESS WATER IN OIL AND GAS WELLS

BACKGROUND OF THE INVENTION

1. Field of the Invention

This invention relates to a method of selectively reducing excessive production of aqueous fluids within subterranean formations.

2. Summary of the Prior Art

The production of water and aqueous fluids in oil and gas wells can present a variety of problems. As gas and oil are removed from a producing well, water begins to push through the formation into the well where it is eventually produced along with the oil and gas. This reduces the amount of oil and gas that can be recovered. Once the water is removed from the well, it must be separated from the produced hydrocarbons and disposed of in an environmentally safe manner. This adds additional expense to the recovery operation. It is therefore advantageous to treat the well to minimize water production.

Prior art methods that have been used to restrict water production include the gelation of polyvinyl alcohol (PVA), polyacrylic acid and the condensation polymerization of phenol and formaldehyde within the formation's pore channels. These processes are designed to damage the pore channel within the formation matrix and restrict fluid movement through the channels. Another technique involves loading a subterranean area adjacent to the wellbore with a barrier, such as concrete, resin or particulate matter, so that the loaded area is effectively plugged. The area above the loaded area is then perforated to begin production. Unfortunately, these prior art methods are nondiscriminating and tend to damage both the hydrocarbon and water producing channels.

Another problem with many of the water control compounds used in reducing water production in oil and gas wells are that they are unstable in acids and heavy brines which are frequently found within oil and gas wells. Furthermore, many degrade with increased temperature. Thus these compounds are rendered useless in many downhole applications.

What is needed is a method for reducing the production of water in oil and gas wells by selectively treating the water bearing formations without damaging the hydrocarbon bearing formations, and which is not affected by the acidic or alkaline conditions, salt content or high temperatures which are frequently found within these wells.

SUMMARY OF THE INVENTION

A method for selectively reducing production of aqueous fluids within a hydrocarbon bearing subterranean formation is achieved by introducing a hydrocarbon carrier fluid containing discrete water absorbing particles into fluid passages of the formation. The particles are dispersed throughout the carrier fluid with each particle consisting essentially of hydratable polymers which are cross-linked so that the polymers are insoluble in water. The particles are allowed to absorb water within aqueous fluid conducting passages so that the particles swell and restrict the flow of fluids through the aqueous fluid conducting passages while remaining unswollen in the hydrocarbon fluid conducting passages.

The particles can be formed by preparing an aqueous solution of polymerizable, hydrophilic monomers and mixing the aqueous solution with an immiscible liquid. An emulsion is then formed with the aqueous solution being dispersed within the immiscible liquid as discrete, submicron micelles. The micelles are then polymerized within the emulsion to form hydratable polymers which are cross-linked together to form the water absorbing particles which are insoluble in water. The polymers may be cross-linked either internally during polymerization or externally by the addition of surface cross-linking agents.

These and other features, aspects, and advantages of the present invention will become apparent with reference to the following description and claims.

DETAILED DESCRIPTION OF THE INVENTION

Superabsorbing materials have been used in many applications for absorbing excess water. These particles are commercially used in such products as diapers and feminine hygiene products to rapidly absorb aqueous fluids. The superabsorbing particles can typically absorb 10 to 1000 times their weight of water and are stable at temperatures up to 300° F. While these particles are suitable for many applications, such as those described above, the present invention involves the use of such particles in the treatment of water bearing subterranean formations, such as in oil and gas wells, where water production can be undesirable.

As discussed herein, superabsorbers refer to those materials or particles which are formed from hydratable polymers that are cross-linked to prevent their solubilization in aqueous fluids while allowing the particles to absorb water. These superabsorbing particles or materials are typically polymerized using precipitation polymerization techniques. In precipitation polymerization the polymers grow in size until they begin to precipitate out of solution. This results in a very large particle size of between 5–300 microns in diameter. These superabsorbing particles are commercially available such as those manufactured under the name "Sanwet" by Hoechst Casella in Frankfurt, Germany.

While larger superabsorber particles may be particularly suited for treating highly permeable water bearing formations containing fractures and large pore channels, they present problems when treating formations of lower permeability. When used in reservoirs having permeabilities of less than 0.50 darcy, these larger superabsorbing particles tend to filter out onto the surface of the rock, causing extensive damage to both hydrocarbon and water bearing formations. In order to form smaller particles, i.e., particles having a particle size of less than 5 microns, superabsorbing particles have been prepared using invert emulsion polymerization techniques which are described in more detail in the discussion which follows.

In preparing superabsorbing particles, various hydrophilic monomers are used in the polymerization. In this disclosure, the term "monomer" refers to those molecules or compounds capable of conversion to polymers by combining with other like or similar molecules or compounds. The hydrophilic monomers may include both ionic and nonionic monomers. In this disclosure, the term "nonionic monomer" refers to monomers that do not ionize in an aqueous solution at neutral pH. Examples of suitable nonionic hydrophilic monomers for use in superabsorbers include acrylamide, vinyl pyrrolidone and n-vinylacetamide. The ionic monomers may be either anionic or cationic. Examples of anionic monomers include the alkali salts of acrylic acid, acrylamidomethylpropanesulfonic acid (AMPS), maleic acid, itaconic acid, styrene sulfonic acid and vinylphosphonic acid. The cationic monomers include dimethyldiallylammonium chloride and quaternary ammonium salt derivatives from acrylamide or acrylic acid such as acrylamidoethyltrimethylammonium chloride.

These hydrophilic monomers may be polymerized and cross-linked either with or without an internal cross-linking agent. The internal cross-linking agent is a monomer having at least two reactive sites. Divinyl monomers are preferred for use as the internal cross-linking agents. These "cross-linking" monomers may also be hydrophilic and can be either ionic or nonionic. During polymerization of the hydrophilic monomers, the two double bonds of these internal cross-linking monomers allow two polymer chains to grow out of the divinyl monomer. This results in the polymer chains being cross-linked at the location of the divinyl monomer forming a three-dimensional network. Examples of suitable divinyl compounds for use as internal cross-linking agents include divinyl benzene, methylene bisacrylamide, bisphenol A diacrylate, 1,4-butylene glycol diacrylate, diallylamine, N,N-diallylacrylamide, diallyldimethylammonium chloride, diallyl esters such as diallyl adipate, 1,4-divinyloxybutane, divinyloxyethane, divinyldimethylsilane, divinyl sulfone, divinyl tetramethyl disiloxane and N-methylol acrylamide. Also, adducts resulting from the addition of aldehydes such as formalin or glyoxal to vinyl amides form cross-link junctions during the polymerization. The amount of internal cross-linking is controlled by the amount of divinyl compound used.

The preferred type of superabsorbing particle used for reducing water production depends upon the type of formation being treated. As mentioned, the particles may be formed from various monomers, including anionic and cationic monomers. Depending upon the formation being treated, the ionic pendant groups of the particles will tend to be either attracted to or repelled from the formation. For instance, carbonate formations, such as lime, are typically cationically charged. Therefore, it is preferable to have a superabsorbing particle formed, in part, from anionic hydrophilic monomers. Preferably, the anionic monomers are the sulfonate monomers, i.e. those monomers containing —$SO_3$— pendant or functional groups. Due to the anionic charges of these particles, the particles will be attracted and adhere to the carbonate formations. Likewise, for silicate containing formations, which are usually anionically charged, it is preferable to have a particle that has cationic pendant groups.

Superabsorbers with particular ionic groups are also preferred when treating formations having a high salt content or in acidic or alkaline conditions. The type of superabsorbing particles used depends on the type of salt and/or the pH of the formation to be treated. Particles with ionic groups are preferred for use under acid or brine conditions. When treating formations with high salt content, superabsorbers with a large number of ionic groups are preferred. For example, sulfonated superabsorbers are both salt and acid tolerant and can be used in heavy brines or acidic fluids. It should be noted, however, that while superabsorbing particles formed using ionic monomers are preferred in many instances, they are not essential. Superabsorbing particles can be polymerized using nonionic hydrophilic monomers alone or with other ionic monomers. The superabsorbing polymers of the invention, however, are preferably copolymers of the nonionic and ionic hydrophilic monomers.

Depending upon the particular application and treatment, the superabsorbing particles may either be internally cross-linked, externally cross-linked or both. External or surface cross-linking differs from internal cross-linking in that it is carried out at the surface of the polymer particle after the polymer particle has been formed. The polymer particles which are merely internally cross-linked are characterized by having "sticky" surfaces. It is believed these sticky surfaces are due to the functional groups adhering to the surfaces of the formation. These sticky surfaces have a high degree of elasticity which allows the particles to film over pore channels of formations having low permeabilities so that the producing formations are rendered unusable for oil and gas well purposes. High back pressures are often encountered when introducing these particles into the formation. Cross-linking the surface of the polymeric polymers with a surface cross-linking agent removes this stickiness and produces superabsorbers which are more suitable for porous formations having low permeability.

The surface cross-linking agents cross-link certain pendant groups attached to the polymer chains of the polymer particle at or near the particle surface. For example, carboxylate or hydroxyl groups pendant to a polymer chain are cross-linked when reacted with epoxides. These epoxides are preferably di-epoxides although they may be multi-epoxides as well. It should be noted that the surface cross-linking can be accomplished either with or without internal cross-linking. Co-polymers containing carboxylated salts can be surface cross-linked with compounds containing di- or multi-epoxides. Suitable surface cross-linking agents include ethylene glycol diglycidyl ether, epihalohydrins (for example, epibromohydrin and epichlorohrydrin), epoxy resins and diglycidyl ethers, such as the diglycidyl ether of 1,4-butanediol. Another class of compounds that provide surface cross-linking are those used to cross-link hydrated polymers. In this case the particles are treated with salts or complexes of metals such as chromium, zirconium, titanium and aluminum before being placed in an aqueous environment.

Invert emulsion polymerization is generally known in the field of polymer chemistry. Such polymerization reactions are disclosed in *Emulsion Polymers and Emulsion Polymerization,* American Chemical Society (ACS) Symposium Series 165 (1981), which is herein incorporated by reference. In general, invert emulsion polymerization involves preparing a solution of the compounds to be polymerized in a water solvent. A quantity of oil or other immiscible liquid is then added to the solution to form an oil-external emulsion, with the internal phase being the water/monomer solution. By applying shear to the mixture, micelles of the water/monomer solution are formed within the immiscible oil. Emulsifiers or surfactants can also be added to the emulsion. The size of the micelles is controlled by the type of emulsifier or surfactant used and the amount of shear imposed while forming the emulsion. Polymerization is then initiated within the micelles so that the micelles form discrete polymerized particles.

Using these invert emulsion techniques, superabsorbant particles can be formed having much smaller diameters. Particles with diameters as small as 0.001 microns having been achieved using these techniques. The particles are cross-linked either during or after the polymer particles have been formed in the emulsion. Emulsions used in the invention typically have micelles ranging from 0.005 to 2 microns. It should be noted that the size of the micelles formed are dependent upon the shear and type of emulsifier used. The type of emulsifier used may vary, however, an emulsifier or blend of emulsifiers having a hydrophilic lipophilic balance (HLB) between 4 and 8 is preferable. Suitable emulsifiers are nonionic ethoxylates, for example, n-nonylphenol ethoxylate with about 10% ethoxylation.

In preparing the smaller particles in the invert emulsion polymerization, the compounds to be polymerized are dissolved within an aqueous solution. The amount of water solvent used may vary, but it is typically around 50% of the total weight of the water/monomer solution. The amount of reactants also varies. The amount of nonionic hydrophilic monomers, such as acrylamide, may vary between 30 to 99.9% by total weight of monomers (twm). The ionic hydrophilic monomers, either anionic or cationic, may vary between 0 to 70% twm. Depending upon the amount of internal cross-linking desired, the amount of divinyl cross-linking monomers can range between 0 to 1.0% twm.

It may sometimes be necessary to neutralize the solution due to the presence of the acidic or basic compounds used in the polymerization. A pH between 7 and 8.5 is preferred for polymerization.

After the monomer solution is prepared, it is then added to an immiscible oil phase solvent. The amount of the oil phase may vary but typically makes up about ⅓ of the total volume of the emulsion. The oil phase solvent is preferably a refined oil having a boiling point in excess of 120° C. These refined oils may be aliphatic, alicyclic or aromatic compounds and mixtures thereof, with the aliphatic compounds being preferred. More preferred solvents are the straight or branched chain alkane oils, such as hexane, having carbon constituents of five carbons or more. Examples of suitable oil phase solvents are "NORPAR 12", "ISOPAR L" and "ESCAID", all available from Exxon, and white mineral oil, such as 21 USP White Mineral Oil, available from Amoco.

An emulsion is then formed by conventional methods, such as with the use of a homogenizer, where shear is applied to the water/monomer solution to achieve the desired micelle size. Emulsifiers may also be added to the emulsion to help stabilize and further facilitate formation of discrete micelles within the emulsion. Once the emulsion is formed, polymerization is initiated with one or more catalysts. The catalysts may be a single catalyst or a system in which a catalyst and promoter are added. Typical catalyst are free radical oxidizers. Oxidizing agents such as the hydroperoxides, for example, cumene hydroxide, and persulfates, such as ammonium persulfate, may be used.

Use of co-catalysts or promoters also aid in the polymerization of the superabsorbing particles. These promoters act as reducing agents which slow down the release of free radicals. This favors a slow build up of linear, high molecular weight polymers. Typical promoters include sodium sulfite, thionyl chloride and thionyl bromide. These promoters react with the free radical of the catalyst so that the rate of polymerization of the polymer particles is controlled.

Because of the exothermic nature of the reaction initiated by the addition of the catalyst, evidence of the reaction is indicated by increased temperature of the emulsion. Preferably, the temperature of the reacting emulsion is maintained at a constant temperature of approximately 30° C., however, gradual temperature increases of the reacting emulsion are acceptable.

The emulsion polymerization reactions are preferably carried out in oxygen free or in a reduced oxygen environment. Closed reactors in which oxygen has been removed and the reactor has been re-pressurized with nitrogen gas or emulsions where nitrogen gas is bubbled throughout the reacting emulsion are preferred.

The amount of water within the micelles depends upon the amount of water used in preparing the water/monomer solution. For example, if 50% water is used in preparing the water/monomer solution, the amount of water within the micelles will be approximately 50%, with the remainder being polymer. This is a very small amount compared to the amount of water the particles can absorb. If internal cross-linking agents are used in the polymerization, as the polymers grow within the micelles of the invert emulsion, each micelle ends up being a partially dehydrated, internally cross-linked particle. Surface cross-linking agents may also be added to the emulsion after the polymerization reaction is complete, with or without internal cross-linking. The surface cross-linking agents are preferably added in an oil-phase carrier and mixed with the emulsion. The amount of surface cross-linking agents can range from 0.0001 to 5% based on the weight of the polymer. Preferably the amount of surface cross-linking agent is 0.01 to 1%.

Once the superabsorbing particles are prepared in the invert emulsion as described above, the emulsion may be added to a suitable hydrocarbon carrier fluid. If a high concentration of particles are formed in the invert emulsion, the emulsion may be very viscous, however, there will be no affinity for the other particles so that the emulsion pours very easily. The hydrocarbon carrier fluid may be those refined oils such as kerosene, diesel or aromatic solvents such as xylene and toluene. The amount of emulsion added to the carrier fluid may vary between ½ to 5% by weight depending upon the porosity of the formation to be treated. For example, a formation having porosity of 10 millidarcy may be treated using ½ percent by weight of the emulsion within the carrier fluid, wherein the emulsion has a particle concentration of 30% by weight of the emulsion. For rock formations having a greater permeability, for example 30 millidarcy, 1 to 2% of the emulsion may be used in the carrier fluid. Additional emulsifiers may be added to disperse the invert emulsion in the carrier fluid.

In treating subterranean formations, a sample of the formation to be treated is first taken in order to determine the composition of the formation being treated and its permeability. The salt content and the pH of the fluids within the well are also determined. Once the permeability of the sample and its composition are determined, an appropriate emulsion is prepared. For example, if the well fluids are acidic and the formation is a silicate formation, particles prepared with anionically charged functional groups, such as the alkylide salt of acrylic acid, are preferably used. For wells containing heavy brines, particles with fewer cross-link junctions are preferred. Salt affects the particles' affinity for water, reducing the particles' ability to swell. Fewer cross-linked junctions allows the particles to swell to a greater degree.

For formations with permeabilities of less than 10 millidarcy, the smaller particles prepared using the invert emulsion techniques described above are used in an amount ranging between 0.25 and 0.5% by weight of the carrier fluid. Once the invert emulsion is prepared in the appropriate concentration, the invert emulsion is added to the hydrocarbon carrier fluid as described above. Because the hydrocarbon carrier fluid contains no aqueous fluids, the particles within the emulsion remain small and unswollen. The combined fluids are then introduced into the well where the small particles within the hydrocarbon carrier fluid permeate the pore channels of the formation. It may be preferable to initially introduce a small amount of oil or other hydrocarbon into the formation prior to treatment with the emulsion to clean out residual water which may be present in the hydrocarbon producing zones. If the formation being treated is an unfractured, low permeable formation, a surface cross-linked particle suspension should be used. This avoids the sticky character of those particles which are only internally cross-linked that would otherwise tend to bind together and damage the pore channels, reducing permeability.

The hydrophilic groups of the superabsorber cause the particles to adsorb to the rock face of the pore channels and assure long term placement within these channel. After the particles have been introduced into the pore channels of the formations, the particles within those pore channels or fluid passages which are hydrocarbon producing pore channels will remain small and unswollen because there is little, if any, water to absorb. In the aqueous fluid bearing pore channels, water is absorbed within the superabsorbing particles so that the particles begin to swell. The amount of swelling is dependent upon the size of the particles, the amount of cross-linking, branch intermeshing between the polymer particles, the presence of salt within the aqueous fluids and the particles' affinity to water due to the number of functional groups on the polymer chains. As discussed, particles may swell anywhere from 10 to 1000 times their original size.

As water continues to invade the hydrocarbon producing channels, water will eventually cause the polymer particles to swell so that they fill the pore spaces or migrate to smaller pore throats within the pore channels. The swollen particles are very plastic-like and are easily deformed so that they film over these pore throats. This blockage substantially reduces the flow of aqueous fluids through the channels so that the amount of water produced throughout the well is eventually reduced or eliminated.

If the formation being treated has a high permeability or larger fluid passages, such as fractures, the larger size superabsorbing particles (i.e., particles ranging having diameters ranging from 5 to 300 microns) are used. Here the particles are suspended in a hydrocarbon carrying fluid in an amount between ½ to 5% by weight. The hydrocarbon carrier is preferably the refined oils such as those used with the invert emulsion. The larger commercially prepared superabsorbing particles will typically have a lower water content than those prepared using the invert emulsion. Typically the water content is around ½% of the weight of the particle. When treating naturally fractured formations, it may be desirable to use only those particles which are internally cross-linked. The sticky surface of the internally cross-linked particles and the ionic functional groups facilitate adhesion of the particle to the walls of the fracture network. A combination of anionic and cationic particles can also be mixed together to enhance this stickiness. This is important because of the lack of pore throats and constrictions in these fractured formations.

EXAMPLES

The following examples illustrate the utility of the invention and serve to further illustrate the method and techniques used in treating subterranean formations. Permeabilities were determined using testing procedures established by the American Petroleum Institute and specified in API RP-27 (3rd Edition). Particle size was determined with conventional scanning electron microscopy techniques and measured from photomicrographs.

EXAMPLE 1

An invert emulsion was prepared by combining 173.15 g of acrylamide as an nonionic hydrophilic monomer, 35.13 g of acrylic acid as an anionic hydrophilic monomer and 0.264 g of methylene bisacrylamide as an internal cross-linking agent to 125.40 g of deionized water. The solution was then neutralized by the slow addition of 77.82 g of a 25% aqueous sodium hydroxide solution to a pH of 7.46.

The oil phase was prepared by adding emulsifiers of 12.00 g of "HYPERMER 2296", available from ICI Americas, Inc., and 2.50 g of "IGEPAL CO- 630", available from Rhone-Poulenec, to 179.65 g of "NORPAR 12". The aqueous phase or solution was then slowly added to the oil phase while homogenizing for four minutes at 24,000 rpm with a Janke Kunkel Ultra Turrax homogenizer. The emulsion was then cooled to approximately 8° C. and degassed by bubbling nitrogen gas through the emulsion, while stirring in a resin kettle. The polymerization was initiated with a 1 ml solution of 2% by weight cumene hydroperoxide in "NORPAR 12". A co-catalyst solution was prepared by adding three drops of thionyl chloride to 10 ml of "NORPAR 12" that was then slowly added throughout the polymerization. With the addition of the first few drops of co-catalyst solution, the emulsion temperature began to increase. Within thirty seconds, the temperature rose from approximately 8° C. to 49° C. and after 5 minutes, peaked at 94° C. The emulsion was then cooled to room temperature. The viscosity of the resulting emulsion was 90.5 cps at 511/s as measured on a Fann 35 viscometer using a 2% by weight of emulsion in deionized water. The particles formed in the emulsion had an average particle size of 0.5 micron.

To determine the potential water shut-off using the prepared emulsion, 1% by weight of the emulsion was dispersed in "NORPAR 12". A 2.5 by 5.0 cm Brea sandstone core cylinder was placed in a core flow apparatus as described in API RP-27 (3rd Edition) Initially, "NORPAR 12" was flowed through the core while measuring flow rate and pressure. This was to measure a baseline for the permeability of the core. After 119 pore volumes of "NORPAR 12" were flowed through the core sample, the permeability of the core was measured as being approximately 64 millidarcy. The 1% emulsion dispersion was then flowed for 65.7 pore volumes through the core, reducing the permeability to 53 millidarcy. To determine damage to the core sample, 69 volumes of "NORPAR 12" was again flowed through the core. A permeability of 58 millidarcy was achieved. Finally, a 2% aqueous solution of potassium chloride was injected into the core sample in the amount of 11.1 pore volumes. Permeability was reduced to 0.1 millidarcy while pressure increased from 70 psi to 1050 psi. Essentially all the water stopped flowing.

EXAMPLE 2

In this example, the polymer was not internally cross-linked, but instead was combined with a surface cross-linking agent after the polymer particles were formed in the emulsion. In this example, an invert polymer emulsion was prepared in a manner similar to the one described for Example 1. The emulsion polymer contained 30% by weight sodium acrylamido methylpropane sulfonate (AMPS) as an anionic monomer, 36% by weight acrylamide and 34% sodium acrylate which is also an anionic monomer. The polymer content in the invert emulsion was 200 g or 32% by weight. The emulsion was then treated with 2 g of the surface cross-linking agent ethylene glycol diglycidyl ether mixed and heated for three hours at 60° C. This caused the polymer particles to be surface cross-linked. The particles formed had an average size of 0.1 micron.

A dispersion was then prepared by adding 5 g of the surface cross-linked polymer emulsion to 500 g of "ISOPAR L" (Exxon refined oil). A Brea sandstone core sample 5.08 centimeters long and 2.6 cm in diameter having a pore volume of 5.90 ml was placed in a high pressure core compression cell. "ISOPAR L" was pumped through the core while monitoring flow rate and pressure. Permeability was calculated after 65 pore volumes to be 243 millidarcy. The core was then treated with 58 pore volumes of the polymer dispersion yielding a permeability of 108 millidarcy. Forty-six pore volumes of "ISOPAR L" was again flowed through the core yielding 124 millidarcy. Finally, a 2% potassium chloride was pumped and at 1.7 pore volumes, exceeded 1205 psi without any flow. This core was completely impermeable to water.

EXAMPLE 3

In this example, invert emulsions were prepared using polymers with varying amounts of surface cross-linking agent. The procedure of Example 1 was generally followed with the polymer particles being prepared using 30 g of AMPS, 68 g of acrylamide, 9 g acrylic acid and 2 g vinyl phosphonic acid. The emulsion prepared was then diluted between 1 and 2% by weight in a refined oil as in Examples 1 and 2. The surface cross-linking agent used was ethylene glycol diglycidyl ether as given in the amounts as indicated in Table 1. The particles formed had an average particle size of 0.1 micron. Again, the superabsorbers were evaluated by comparing permeability changes in Brea sandstone cores. The pressure and flow rates were measured and used to calculate the permeability according to the specifications set out in API RP-27 (3rd Edition). In some cases a 2% potassium chloride solution was initially used to saturate the core with water. This was followed by refined oil which was injected to establish a permeability baseline. The permeability of the core sample was determined by using refined oil only. A 1 to 2% by weight of emulsion dispersed in oil was then flowed through the core sample followed by refined oil in the reverse direction to determine the amount of damage the polymer particles caused to the permeability of the core to oil. Last, a 2% aqueous potassium chloride solution was flowed through the core and permeability of the core was determined. The results are indicated in Table 1 below. Permeabilities are given in millidarcy.

TABLE 1

| Polymer Dispersion* | Surface Cross-linker** | Perm 2% KCl | Perm Oil | Perm Poly | Perm Oil | Perm 2% KCl |
|---|---|---|---|---|---|---|
| 1 | 0.1 | — | 439.7 | 144.5 | 200.0 | 1.4 |
| 1 | 0.0 | — | 238.6 | 110.8 | 124.9 | 8.0 |
| 1 | 1.0 | — | 210.0 | 45.1 | 79.1 | 0.0 |
| 1 | 1.0 | 16.6 | 102.5 | 91.4 | 95.1 | 2.1 |
| 1 | 1.0 | 18.4 | 77.4 | 59.4 | 70.5 | 5.3 |

*Percent based on the weight of emulsion in the refined oil.
**Percent based on the weight of polymer in the emulsion.

EXAMPLE 4

An emulsion was prepared by combining 30 g of AMPS, 59 g of acrylamide, 9 g of acrylic acid and 2 g of vinyl phosphonic acid and 0.56 g of an internal cross-linking monomer of methylene bisacrylamide. Again, the procedures of Example 1 were followed generally in preparing the invert emulsion. The resulting particles had an average particle size of 0.1 micron. Brea sandstone cores were used to determine changes in permeability. Refined oil was initially injected into the core samples to establish a permeability baseline. Next, the polymer emulsion was added to refined oil in an amount of 1 to 2% by weight. The flow direction was then reversed and oil was again flowed through the core to determine the amount of damage the polymer caused to the oil permeability. Finally, an aqueous 2% potassium chloride solution was flowed through the core sample in order to determine the amount of damage caused by the interaction of the polymer and water. The results are given in Table 2.

TABLE 2

| Polymer Dispersion* | Surface Cross-linker** | Perm 2% KCl | Perm Oil | Perm Poly | Perm Oil | Perm 2% KCl |
|---|---|---|---|---|---|---|
| 1 | 0.0 | — | 182.7 | 112.6 | 158.8 | 11.0 |
| 1 | 0.1 | — | 221.1 | 88.6 | 108.9 | 4.1 |
| 1 | 1.0 | — | 242.9 | 105.8 | 139.8 | 6.1 |

*Percent based on the weight of emulsion in the refined oil.
**Percent based on the weight of polymer in the emulsion.

EXAMPLE 5

An invert emulsion was prepared using 66 g of acrylamide and 34 g of acrylic acid. In this case the procedures of Example 4 were followed except that no internal cross-linking monomer was used. The particles formed had an average particle size of 0.1 micron. The results are given in Table 3.

TABLE 3

| Polymer Dispersion* | Surface Cross-linker** | Perm 2% KCl | Perm Oil | Perm Poly | Perm Oil | Perm 2% KCl |
|---|---|---|---|---|---|---|
| 1 | 0.1 | — | 181.7 | 68.9 | 66.3 | 2.7 |
| 1 | 1.0 | 11.6 | 58.2 | 47.9 | 50.0 | 1.6 |

*Percent based on the weight of emulsion in the refined oil.
**Percent based on the weight of polymer in the emulsion.

The use of the superabsorbing particles in treating subterranean formations has several advantages. Because the particles only swell with the absorption of water, water bearing formations can be selectively treated without damaging the hydrocarbon bearing formations. The particles are not affected by acidic or alkaline conditions, salt content or high temperatures which are frequently found within these wells.

While the invention is shown in only some of its forms, it should be apparent to those skilled in the art that it is not so limited but is susceptible to various changes and modifications without departing from the scope of the invention.

We claim:

1. A method of selectively reducing production of aqueous fluids from a reservoir within subterranean formations having low permeabilities, the method comprising the steps of:

introducing a non-aqueous, hydrocarbon fluid containing discrete unswollen, submicron water absorbing particles which are dispersed throughout the hydrocarbon fluid into pore channels of the formation, at least some of the pore channels being aqueous fluid conducting pore channels, the absence of aqueous fluid within the hydrocarbon fluid serving to retain the particles in an unswollen state, and wherein each particle consists essentially of hydratable polymers which are cross-linked so that the polymers are insoluble in water; and allowing the particles to absorb water within the aqueous fluid conducting pore channels so that the particles swell within the aqueous fluid conducting pore channels and restrict the flow of fluids through the aqueous fluid conducting pore channels.

2. The method of claim 1, wherein:

the polymers are surface cross-linked.

3. The method of claim 1, wherein:

the step of introducing the hydrocarbon fluid includes injecting the hydrocarbon fluid into a fracture network of a fractured reservoir.

4. The method of claim 1, wherein:

the hydratable polymers are formed by polymerizing nonionic hydrophilic monomers and ionic hydrophilic monomers in a water-in-oil emulsion.

5. The method of claim 4, wherein:

the nonionic hydrophilic monomers are selected from a group consisting of acrylamide, vinyl pyrrolidone and n-vinylacetamide.

6. The method of claim 4, wherein:

the ionic hydrophilic monomers are selected from a group consisting of acrylic acid, acrylamidomethylpropanesulfonic acid, maleic acid, itaconic acid, styrene sulfonic acid, vinylphosphonic acid, dimethyldiallylammonium chloride, quaternary ammonium salt derivatives of acrylamide, and quaternary ammonium salt derivatives of acrylic acid.

7. The method of claim 1, further comprising:

the hydratable polymers are formed by polymerizing nonionic hydrophilic monomers, ionic hydrophilic monomers with a cross-linking agent in a water-in-oil emulsion.

8. The method of claim 7, wherein:

the cross-linking agent is selected from a group consisting of divinyl benzene, bisphenol A diacrylate, 1,4-butylene glycol diacrylate, diallylamine, n,n-diallylacrylamide, diallyldimethylammonium chloride, diallyl esters, 1,4-divinyloxybutane, divinyloxyethane, divinyldimethylsilane, divinyl sulfone, divinyl tetramethyl disiloxane, methylene bisacrylamide and n-methylol acrylamide.

9. The method of claim 7, wherein:

the nonionic hydrophilic monomers are selected from a group consisting of acrylamide, vinyl pyrrolidone and n-vinylacetamide.

10. The method of claim 7, wherein:

the ionic hydrophilic monomers are selected from a group consisting of acrylic acid, acrylamidomethylpropanesulfonic acid, maleic acid, itaconic acid, styrene sulfonic acid, vinylphosphonic acid, dimethyldiallylammonium chloride, quaternary ammonium salt derivatives of acrylamide, and quaternary ammonium salt derivatives of acrylic acid.

11. A method of selectively reducing production of aqueous fluids within hydrocarbon bearing subterranean formations in oil and gas wells, the method comprising the steps of:

preparing an aqueous solution of polymerizable hydrophilic monomers and cross-linking monomers;

mixing the aqueous solution with an immiscible liquid so that an emulsion is formed with the aqueous solution being dispersed within the immiscible liquid as discrete submicron micelles;

polymerizing the monomers within the submicron micelles so that the monomers form hydratable polymers which are cross-linked so that the hydratable polymers form discrete submicron, water absorbing particles that are insoluble in water;

diluting the emulsion in a non-aqueous, hydrocarbon carrier fluid, the absence of aqueous fluid within the hydrocarbon carrier fluid serving to retain the particles in an unswollen state;

introducing the hydrocarbon carrier fluid and the emulsion with the water absorbing particles into fluid passages of the formation, wherein some of the fluid passages are aqueous fluid conducting passages and some are hydrocarbon fluid conducting passages; and allowing the particles within the aqueous fluid conducting passages to absorb water and swell within the aqueous fluid conducting passages while remaining unswollen in the hydrocarbon fluid conducting passages so that the flow of aqueous fluid through the aqueous fluid conducting passages is reduced.

12. The method of claim 11, wherein:

the amount of emulsion diluted in the hydrocarbon carrier fluid is between 0.25 to 5% by weight.

13. The method of claim 11, further comprising the step of:

surface cross-linking the water absorbing particles by adding a surface cross-linking agent which is dispersed within the immiscible liquid prior to introducing the emulsion with the water absorbing particles into the fluid passages of the formation.

14. The method of claim 11, further comprising:

determining the composition of the formation to be treated; and selecting the hydrophilic monomers from among anionic, cationic and nonionic monomers based upon the composition of the formation prior to preparing the aqueous solution.

15. A method of selectively reducing production of aqueous fluids within hydrocarbon bearing subterranean formations in oil and gas wells, the method comprising the steps of:

preparing an aqueous solution of polymerizable hydrophilic monomers and cross-linking monomers;

mixing the aqueous solution with an immiscible liquid so that an emulsion is formed with the aqueous solution being dispersed within the immiscible liquid as discrete submicron micelles;

polymerizing the monomers within the submicron micelles so that the monomers form hydratable polymers which are cross-linked so that the hydratable polymers form discrete submicron, water absorbing particles that are insoluble in water;

surface cross-linking the water absorbing particles within the emulsion; then introducing the emulsion with the water absorbing particles into fluid passages of the formation, wherein some of the fluid passages are aqueous fluid conducting passages and some are hydrocarbon fluid conducting passages; and allowing the particles within the aqueous fluid conducting passages to absorb water and swell within the aqueous fluid conducting passages while remaining unswollen in the hydrocarbon fluid conducting passages so that the flow of aqueous fluid through the aqueous fluid conducting passages is reduced; and wherein the step of surface cross-linking the water absorbing particles is accomplished by adding an epoxide surface cross-linking agent to the emulsion.

16. The method of claim 15, wherein:

the surface cross-linking agent is selected from a group consisting of epoxy resins, diglycidyl ethers and epihalohydrins.

17. A method of selectively reducing production of aqueous fluids within hydrocarbon bearing subterranean formations in oil and gas wells, the method comprising the steps of:

preparing an aqueous solution of polymerizable hydrophilic monomers and cross-linking monomers;

mixing the aqueous solution with an immiscible liquid so that an emulsion is formed with the aqueous solution being dispersed within the immiscible liquid as discrete submicron micelles;

polymerizing the monomers within the submicron micelles so that the monomers form hydratable polymers which are cross-linked so that the hydratable polymers form discrete submicron, water absorbing particles that are insoluble in water;

surface cross-linking the water absorbing particles within the emulsion; then introducing the emulsion with the water absorbing particles into fluid passages of the formation, wherein some of the fluid passages are aqueous fluid conducting passages and some are hydrocarbon fluid conducting passages; and allowing the particles within the aqueous fluid conducting passages to absorb water and swell within the aqueous fluid conducting passages while remaining unswollen in the hydrocarbon fluid conducting passages so that the flow of aqueous fluid through the aqueous fluid conducting passages is reduced; and wherein the step of surface cross-linking the water absorbing particles is accomplished by adding a surface cross-linking agent selected from the group consisting of salts and complexes of chromium, zirconium, titanium and aluminum.

18. The method of claim 13, wherein:

the amount of surface cross-linking agent added to the emulsion is 0.0001 to 5% by weight of the hydratable polymers.

19. The method of claim 11, wherein:

the cross-linking monomers are divinyl monomers.

20. The method of claim 11, wherein:

the cross-linking monomers are selected from a group consisting of divinyl benzene, bisphenol A diacrylate, 1,4-butylene glycol diacrylate, diallylamine, n,n-diallylacrylamide, diallyldimethylammonium chloride, diallyl esters, 1,4-divinyloxybutane, divinyloxyethane, divinyldimethylsilane, divinyl sulfone, divinyl tetramethyl disiloxane, methylene bisacrylamide and n-methylol acrylamide.

21. The method of claim 11, wherein:

the step of forming an aqueous solution includes forming a solution of nonionic hydrophilic monomers, ionic hydrophilic monomers and cross-linking monomers.

22. The method of claim 21, wherein:

the nonionic hydrophilic monomers are selected from a group consisting of acrylamide, vinyl pyrrolidone and n-vinylacetamide.

23. The method of claim 21, wherein:

the ionic hydrophilic monomers are selected from a group consisting of acrylic acid, acrylamidomethylpropanesulfonic acid, maleic acid, itaconic acid, styrene sulfonic acid, vinylphosphonic acid, dimethyldiallylammonium chloride, quaternary ammonium salt derivatives of acrylamide, and quaternary ammonium salt derivatives of acrylic acid.

24. The method of claim 11, wherein:

the amount of cross-linking monomers is between 0.0001% and 5% of the total weight of monomers.

25. The method of claim 11, wherein:

the immiscible liquid is an aliphatic hydrocarbon liquid having a boiling point in excess of 120° C.

26. A method of selectively reducing production of aqueous fluids within hydrocarbon bearing subterranean formations in oil and gas wells, the method comprising the steps of:

preparing an aqueous solution of polymerizable hydrophilic monomers;

mixing the aqueous solution with an immiscible liquid so that an emulsion is formed with the aqueous solution being dispersed within the immiscible liquid as discrete submicron micelles;

polymerizing the hydrophilic monomers within the submicron micelles so that the monomers form discrete submicron, hydratable polymers particles;

surface cross-linking the polymer particles within the emulsion to form discrete submicron, water absorbing particles that are insoluble in water by adding a surface cross-linking agent which is dispersed within the immiscible liquid;

diluting the emulsion in a non-aqueous, hydrocarbon carrier fluid, the absence of aqueous fluid within the hydrocarbon fluid serving to retain the particles in an unswollen state;

introducing the non-aqueous, hydrocarbon carrier fluid and emulsion with the water absorbing particles into fluid passages of the formation, wherein some of the fluid passages are aqueous fluid conducting passages and some are hydrocarbon fluid conducting passages; and allowing the particles within the aqueous fluid conducting passages to absorb water and swell within the aqueous fluid conducting passages while remaining unswollen in the hydrocarbon fluid conducting passages so that the flow of aqueous fluid through the aqueous fluid conducting passages is reduced.

27. The method of claim 26, wherein: the amount of emulsion dispersed in the hydrocarbon carrier fluid is between 0.25 and 5% by weight.

28. A method of selectively reducing production of aqueous fluids within hydrocarbon bearing subterranean formations in oil and gas wells, the method comprising the steps of:

preparing an aqueous solution of polymerizable hydrophilic monomers;

mixing the aqueous solution with an immiscible liquid so that an emulsion is formed with the aqueous solution being dispersed within the immiscible liquid as discrete submicron micelles;

polymerizing the hydrophilic monomers within the submicron micelles so that the monomers form discrete submicron, hydratable polymer particles;

surface cross-linking the polymer particles within the emulsion to form discrete submicron, water absorbing particles that are insoluble in water;

introducing the emulsion with the water absorbing particles into fluid passages of the formation, wherein some of the fluid passages are aqueous fluid conducting passages and some are hydrocarbon fluid conducting passages; and allowing the particles within the aqueous fluid conducting passages to absorb water and swell within the aqueous fluid conducting passages while remaining unswollen in the hydrocarbon fluid conducting passages so that the flow of aqueous fluid through the aqueous fluid conducting passages is reduced; and wherein the step of surface cross-linking the polymer particles is accomplished by adding a surface cross-linking agent of an epoxide to the emulsion.

29. The method of claim 28, wherein:

the surface cross-linking agent is selected from a group consisting of epoxy resins, diglycidyl ethers and epihalohydrins.

30. The method of claim 28, wherein:

the amount of surface cross-linking agent added to the emulsion is between 0.0001 and 5% by weight of the hydratable polymers.

31. A method of selectively reducing production of aqueous fluids within hydrocarbon bearing subterranean formations in oil and gas wells, the method comprising the steps of:

preparing an aqueous solution of polymerizable hydrophilic monomers;

mixing the aqueous solution with an immiscible liquid so that an emulsion is formed with the aqueous solution being dispersed within the immiscible liquid as discrete submicron micelles;

polymerizing the hydrophilic monomers within the submicron micelles so that the monomers form discrete submicron, hydratable polymer particles;

surface cross-linking the polymer particles within the emulsion to form discrete submicron, water absorbing particles that are insoluble in water;

introducing the emulsion with the water absorbing particles into fluid passages of the formation, wherein some of the fluid passages are aqueous fluid conducting passages and some are hydrocarbon fluid conducting passages and some are hydrocarbon fluid conducting passages; and allowing the particles within the aqueous fluid conducting passages to absorb water and swell within the aqueous fluid conducting passages while remaining unswollen in the hydrocarbon fluid conducting passages so that the flow of aqueous fluid through the aqueous fluid conducting passages is reduced; and wherein the step of cross-linking is accomplished by adding a surface cross-linking agent selected from a group consisting of salts and complexes of chromium, zirconium, titanium and aluminum.

32. The method of claim 26, wherein:

the step of forming an aqueous of polymerizable hydrophilic monomers includes forming a solution of polymerizable hydrophilic monomers wherein at least some of the monomers have pendant groups selected from a group consisting of carboxylate or hydroxyl groups.

33. The method of claim 26, wherein:

the step of forming an aqueous solution includes forming a solution of nonionic hydrophilic monomers, ionic hydrophilic monomers and cross-linking monomers.

34. The method of claim 33, wherein:

the nonionic hydrophilic monomers are selected from a group consisting of acrylamide, vinyl pyrrolidone and n-vinylacetamide.

35. The method of claim 33, wherein:

the ionic hydrophilic monomers are selected from a group consisting of acrylic acid, acrylamidomethylpropanesulfonic acid, maleic acid, itaconic acid, styrene sulfonic acid, vinylphosphonic acid, dimethyldiallylammonium chloride, quaternary ammonium salt derivatives of acrylamide, and quaternary ammonium salt derivatives of acrylic acid.

36. The method of claim 26, wherein:

the immiscible liquid is an aliphatic hydrocarbon liquid having a boiling point in excess of 120° C.

\* \* \* \* \*